US011904602B2

(12) United States Patent
Kobayashi et al.

(10) Patent No.: US 11,904,602 B2
(45) **Date of Patent: *Feb. 20, 2024**

(54) PRINTING DEVICE FOR PERFORMING PARTIAL CUT

(71) Applicant: SEIKO EPSON CORPORATION, Tokyo (JP)

(72) Inventors: Takehiro Kobayashi, Matsumoto (JP); Takeshi Tokuda, Shiojiri (JP)

(73) Assignee: Seiko Epson Corporation, Tokyo (JP)

( * ) Notice: Subject to any disclaimer, the term of this patent is extended or adjusted under 35 U.S.C. 154(b) by 125 days.

This patent is subject to a terminal disclaimer.

(21) Appl. No.: 17/646,920

(22) Filed: Jan. 4, 2022

(65) Prior Publication Data

US 2022/0126603 A1 Apr. 28, 2022

Related U.S. Application Data

(63) Continuation of application No. 16/988,009, filed on Aug. 7, 2020, now Pat. No. 11,254,144.

(30) Foreign Application Priority Data

Aug. 9, 2019 (JP) ................................ 2019-147886

(51) Int. Cl.

*B41J 11/00* (2006.01)
*B41J 11/70* (2006.01)
*B26D 1/08* (2006.01)
*B26D 1/00* (2006.01)

(52) U.S. Cl.

CPC ........... *B41J 11/0045* (2013.01); *B26D 1/085* (2013.01); *B41J 11/703* (2013.01); *B26D 2001/0033* (2013.01)

(58) Field of Classification Search

CPC ................ B41J 11/0045; B41J 11/703; B26D 2001/0033; B26D 1/085

See application file for complete search history.

(56) References Cited

U.S. PATENT DOCUMENTS

| | | | | |
|---|---|---|---|---|
| 6,652,173 | B1 * | 11/2003 | Martini | B41J 11/703 400/621 |
| 8,702,331 | B2 | 4/2014 | Suzuki et al. | |
| 11,254,144 | B2 * | 2/2022 | Kobayashi | B41J 11/0045 |
| 2011/0158731 | A1 | 6/2011 | Suzuki et al. | |

FOREIGN PATENT DOCUMENTS

| | | |
|---|---|---|
| JP | 2005-335315 A | 12/2005 |
| JP | 2011-136472 A | 7/2011 |

* cited by examiner

*Primary Examiner* — Henok D Legesse

(74) *Attorney, Agent, or Firm* — WORKMAN NYDEGGER

(57) ABSTRACT

A printing device includes a transport roller performing a first transport that transports recording paper drawn from roll paper in a transport direction and a second transport that transports the recording paper in a direction opposite to the transport direction, a cutter having a first blade configured to move between an advanced position and a retracted position, and a second blade for cutting the recording paper together with the first blade moving from the retracted position to the advanced position, and a guide member provided downstream of the first blade in the transport direction and guiding the recording paper during the second transport.

6 Claims, 7 Drawing Sheets

PRINTING DEVICE FOR PERFORMING PARTIAL CUT

The present application is a continuation of U.S. patent application Ser. No. 16/988,009, filed Aug. 7, 2020, which is based on, and claims priority from JP Application Serial Number 2019-147886, filed Aug. 9, 2019, the disclosures of which are hereby incorporated by reference here in their entirety.

BACKGROUND

1. Technical Field

The present disclosure relates to a printing device.

2. Related Art

There has been conducted research and development of a printing device that prints an image on recording paper taken out of roll paper.

Here, the printing device often performs a partial cut to partially separate printed recording paper from unprinted recording paper. The printed recording paper is a portion of the recording paper that has been printed. An unprinted recording paper is a portion of the recording paper that has not been printed. The partial cut is performed, for example, in order to suppress a situation where the printed recording paper after being cut from the unprinted recording paper falls to a place not intended by a user and the user loses sight of the printed recording paper.

Further, the printing device performs a back feed of the recording paper in order to match the cut edge of the unprinted recording paper after the partial cut to a predetermined printing start position. The back feed of the recording paper is to transport the recording paper in a direction opposite to a transport direction in which the printing device transports the recording paper. The printing start position is a position where the cut edge of the unprinted recording paper is matched at the timing before the printing on the unprinted recording paper is started so that the position where the printing is started on the unprinted recording paper is not shifted each time the unprinted recording paper is printed. By performing the back feed of the recording paper, the printing device can reduce the amount of the recording paper that is cut off from the unprinted recording paper as the printed recording paper without being printed.

However, when performing the back feed of the recording paper after performing the partial cut, the printed recording paper that is partially connected to the unprinted recording paper may come into contact with a part of the printing device and be torn from the unprinted recording paper.

In this regard, there is known a printing device including a cutter for cutting recording paper by a first blade and a second blade, a driving mechanism for moving the first blade, in which a guide member for guiding the recording paper at the time of back feed is provided on the second blade, and it is possible to suppress printed recording paper partially connected to unprinted recording paper from coming into contact with a part of the printing device when performing back feed of the recording paper (see JP-A-2011-136472).

However, the posture of the printed recording paper that is partially connected to the unprinted recording paper easily changes due to wind, vibration, or the like. For this reason, the printed recording paper may come into contact with the first blade and be torn from the unprinted recording paper.

SUMMARY

In order to solve the above-described problem, according to an aspect of the present disclosure, there is provided a printing device including: a transport roller performing a first transport that transports recording paper drawn from roll paper in a transport direction and a second transport that transports the recording paper in a direction opposite to the transport direction; a cutter having a first blade configured to move between an advanced position and a retracted position, and a second blade for cutting the recording paper together with the first blade moving from the retracted position to the advanced position; and a guide member provided downstream of the first blade in the transport direction and guiding the recording paper during the second transport.

Further, in the printing device of the present disclosure, the guide member may have a slope that is inclined along a direction away from the second blade as going from an upstream region to a downstream region in the transport direction.

Further, in the printing device of the present disclosure, a second guide member provided upstream of the first blade in the transport direction and guiding the recording paper that moves in a direction opposite to the transport direction during the second transport may be further provided.

Further, in the printing device of the present disclosure, the guide member may come into contact with a cut edge of the recording paper cut by the cutter during the second transport.

Further, in the printing device of the present disclosure, the first blade may include a first site at least a part of which is covered by the guide member and which cuts the recording paper together with the second blade, and a second site that forms an uncut portion without cutting the recording paper.

DESCRIPTION OF EXEMPLARY EMBODIMENTS

Embodiment

Hereinafter, embodiments of the present disclosure will be described with reference to the drawings.

Configuration of Printing Device

First, the configuration of a printing device 1 according to the embodiment will be described.

Figure 1:
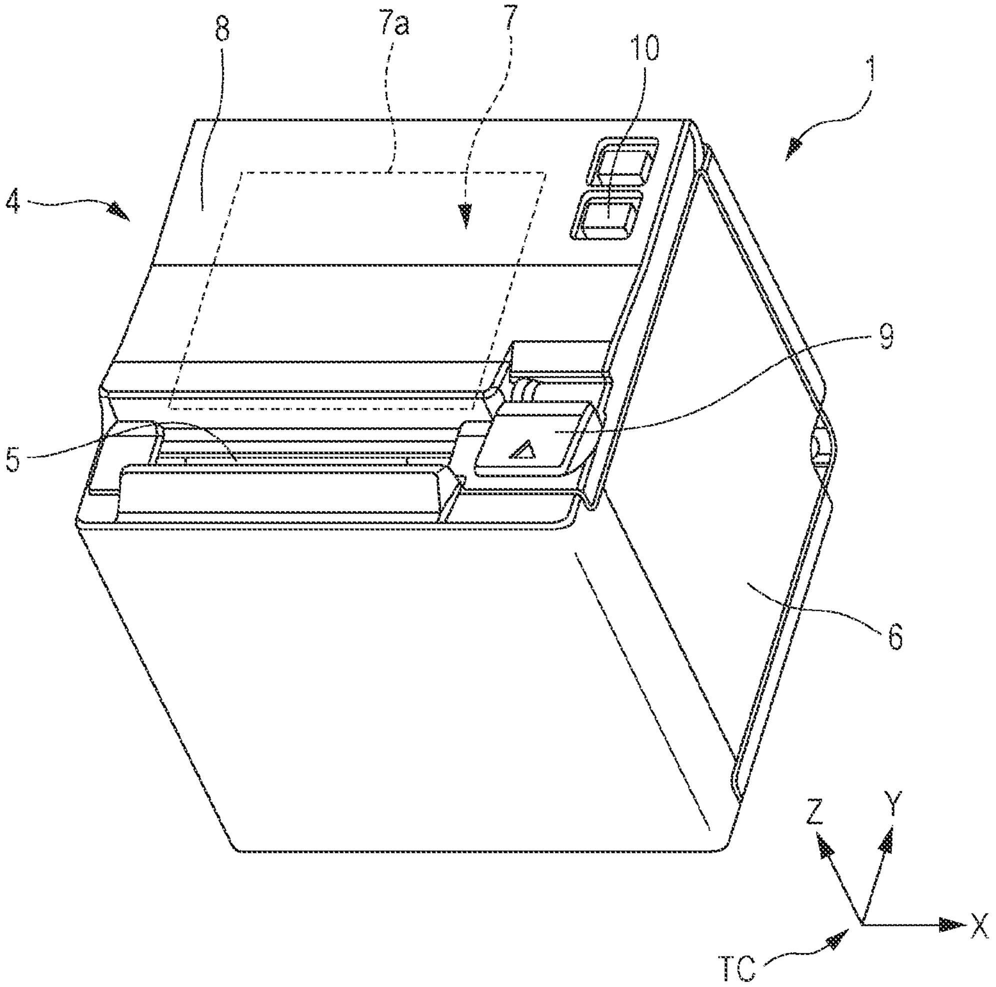
FIG. 1 is a perspective view of a printing device according to an embodiment.
Figure 2:
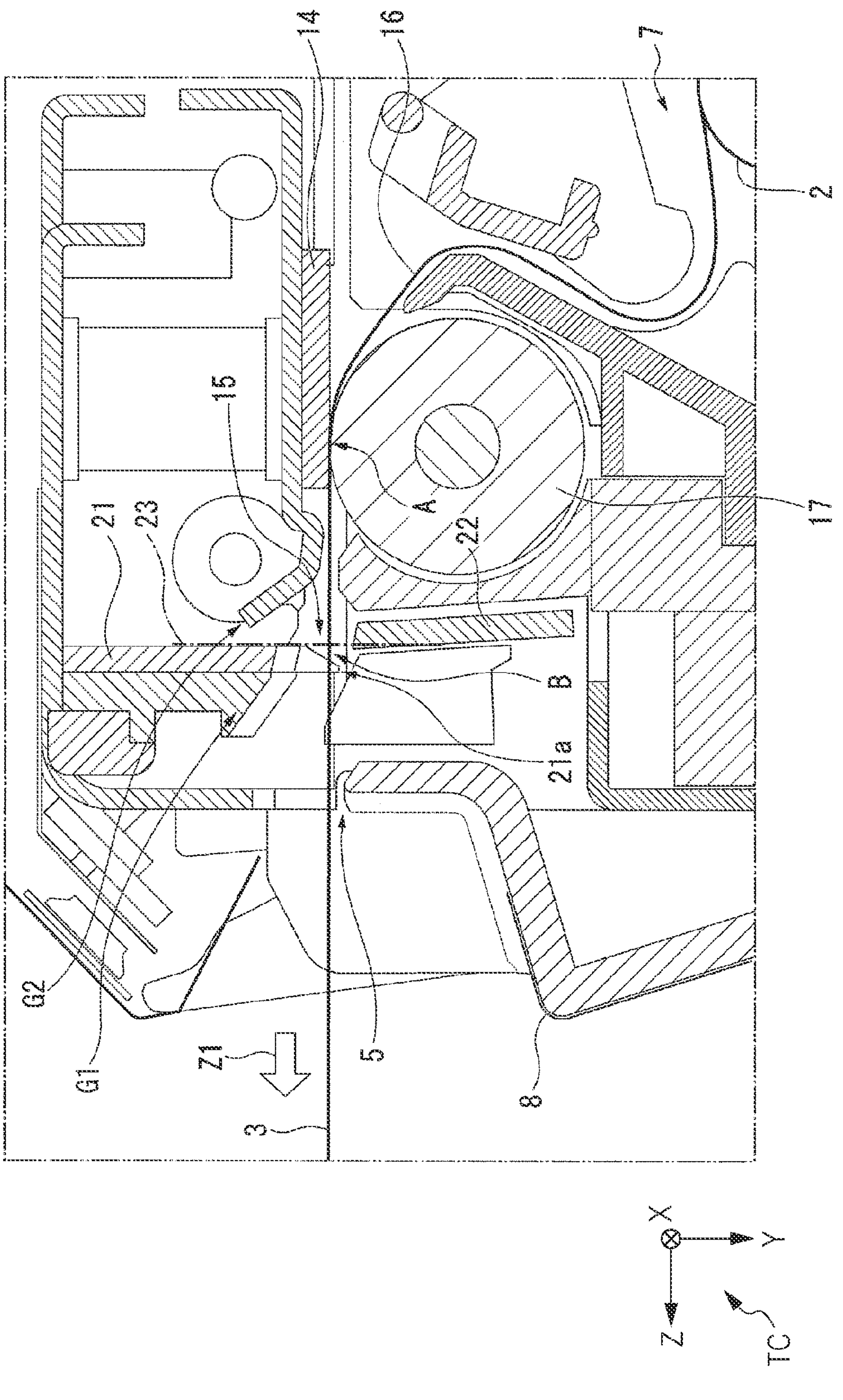
FIG. 2 is a schematic sectional view of the printing device shown in FIG. 1.

FIG. 1 is a perspective view of the printing device 1 according to the embodiment. FIG. 2 is a schematic sectional view of the printing device 1 shown in FIG. 1.

The printing device 1 is a roll paper printer that performs printing on a long recording paper 3 drawn from a roll paper 2 stored inside the printing device 1. As shown in FIG. 1, the printing device 1 includes a printer case 4 having a rectangular parallelepiped shape as a whole. The printer case 4 is provided with a discharge port 5 for discharging the recording paper 3.

Here, a three-dimensional coordinate system TC is a three-dimensional orthogonal coordinate system indicating a direction in each drawing in which the three-dimensional coordinate system TC is drawn. In the following, for convenience of explanation, the X axis in the three-dimensional coordinate system TC will be simply referred to as the X axis. In the following, for convenience of explanation, the Y axis in the three-dimensional coordinate system TC will be simply referred to as the Y axis. In the following, for convenience of explanation, the Z axis in the three-dimensional coordinate system TC will be simply referred to as the Z axis.

In the following, for convenience of explanation, the surface of the rectangular parallelepiped printer case 4 provided with the discharge port 5 is simply referred to as the upper surface, and the surface opposite to the upper surface is simply referred to as the lower surface. In the following, for convenience of explanation, the direction from the lower surface to the upper surface of the two directions orthogonal to the upper surface will be simply referred to as an upward direction or upward. In the following, as an example, a case will be described in which the upward direction coincides with the positive direction of the Z axis as shown in FIG. 1.

In the following, two directions parallel to the central axis of the roll paper 2 stored inside the printing device 1 will be collectively referred to as the width direction of the printing device 1 or simply the width direction for convenience of explanation. Further, In the following, for convenience of explanation, two directions orthogonal to both the up-down direction and the width direction will be collectively referred to as the front-rear direction of the printing device 1 or simply the front-rear direction. In the following, for convenience of explanation, of the surfaces of the rectangular parallelepiped printer case 4, the surface that intersects the front-rear direction and is closer to the discharge port 5 is simply referred to as the front surface, and the surface opposite to the front surface is referred to as a rear surface for convenience of explanation. In the following, for convenience of explanation, the direction from the rear surface to the front surface in the front-rear direction will be simply referred to as the front direction or the front. In the following, for convenience of explanation, a direction from the front surface to the rear surface in the front-rear direction will be simply referred to as a rear direction or the rear. In the following, as an example, a case will be described in which the rear direction coincides with the positive direction of the Y axis as shown in FIG. 1. In this case, since the positive direction of the X axis is in the direction of the vector calculated by the cross product of the vector that faces the positive direction of the Y axis and the vector that faces the positive direction of the Z axis, the positive direction of the X axis coincides with one of the width directions described above. Therefore, in the following, for convenience of explanation, a direction that matches the positive direction of the X axis in the width direction is simply referred to as right direction or right, and a direction opposite to the right direction is simply referred to as left direction or left.

That is, in other words, regarding the discharge port 5, in the printing device 1 shown in FIG. 1, the above-described discharge port 5 is provided on the front side of the upper surface of the printer case 4. The discharge port 5 extends in the left-right direction.

The printer case 4 includes a box-shaped case main body 6 and an opening/closing door 8 that covers the case main body 6 from above. Here, the case main body 6 includes a roll paper storage portion 7 inside. Further, the opening/closing door 8 closes the roll paper input port 7*a* of the roll paper storage portion 7 from above.

The opening/closing door 8 is provided in the rear direction of the discharge port 5. An open/close button 9 is provided in the right direction of the opening/closing door 8. A power switch 10 is provided behind the open/close button 9. When the open/close button 9 is operated, the lock of the opening/closing door 8 is released. When the lock is released, the opening/closing door 8 becomes pivotable around a rotation axis extending in the left-right direction at a rear end portion of the opening/closing door 8. The opening/closing door 8 closes the roll paper storage portion 7 in a prone posture. On the other hand, the opening/closing door 8 opens the roll paper storage portion 7 in an upright posture. In FIG. 1, the opening/closing door 8 closes the roll paper storage portion 7 in a prone posture.

A print head 14 and a cutter 15 are mounted inside the printer case 4 as shown in FIG. 2. Further, inside the printer case 4, a transport path from the roll paper storage portion 7 to the discharge port 5 via a printing position A and a cutting position B is provided as a transport path 16 for the recording paper 3. Here, the printing position A is a position on the transport path 16 where printing is performed on the recording paper 3 by the print head 14. The cutting position B is a position on the transport path 16 where the cutter 15 cuts the recording paper 3.

The print head 14 is a thermal head. The printing position A is defined by a platen roller 17 facing the print head 14. The rotational driving force of a transport motor 18 (not shown in FIGS. 1 and 2) is transmitted to the platen roller 17. The platen roller 17 and the transport motor 18 constitute a transport mechanism that transports the recording paper 3 along the transport path 16. The platen roller 17 is an example of a transport roller.

The printing device 1 drives the print head 14 to print on the recording paper 3 passing through the printing position A. Further, the printing device 1 drives the cutter 15 to perform a partial cut for partially separating the printed recording paper from the unprinted recording paper. The printed recording paper is a portion of the recording paper that has been printed. An unprinted recording paper is a portion of the recording paper that has not been printed. The printing device 1 may be configured to perform a cut that completely separates the printed recording paper from the unprinted recording paper, instead of performing the partial cut.

Further, the printing device 1 drives the transport motor 18 to rotate the platen roller 17 to perform a first transport in which the recording paper 3 set along the transport path 16 is transported at a constant speed in a transport direction Z1. In other words, the platen roller 17 performs the first transport for transporting the recording paper 3 drawn from the roll paper 2 in the transport direction Z1. The first transport may be referred to as a forward feed. The printing device 1 performs the first transport when printing on the recording paper 3, for example. Here, in the example shown in FIGS. 1 and 2, the transport direction Z1 is the upward direction. The transport direction Z1 may be any direction as long as it is a direction in which the recording paper can be discharged from the discharge port 5 instead of the upward direction.

Further, the printing device 1 drives the transport motor 18 to rotate the platen roller 17 to perform the second transport in which the recording paper 3 set along the transport path 16 is transported at a constant speed in a direction opposite to the transport direction Z1. In other words, the platen roller 17 performs the second transport of transporting the recording paper 3 drawn from the roll paper 2 in the direction opposite to the transport direction Z1. The second transport may be referred to as a back feed. The printing device 1 performs the second transport when the position of the cut edge of the unprinted recording paper coincides with a predetermined printing start position, for example, after performing the partial cut by the cutter 15. The printing start position is a position where the cut edge of the unprinted recording paper is matched at the timing before the printing device 1 starts printing on the unprinted recording paper so that the position where the printing is started on the unprinted recording paper is not shifted every time the unprinted recording paper is printed.

Configuration of Cutter

Hereinafter, the configuration of the cutter 15 will be described with reference to FIG. 2. As shown in FIG. 2, the cutter 15 includes a first cutter blade 21 and a second cutter blade 22 for performing a partial cut of the recording paper 3 together with the first cutter blade 21. The cutter 15 includes a first cutter blade moving mechanism (not shown). The first cutter blade moving mechanism converts the rotational motion of the transport motor 18 into a linear motion by a plurality of gears including a pinion rack mechanism. Thereby, the first cutter blade moving mechanism moves the first cutter blade 21 along a moving surface 23 set in advance. The moving surface 23 is a surface that intersects the transport path 16 at the cutting position B, as shown in FIG. 2. The first cutter blade moving mechanism reciprocates the first cutter blade 21 between an advanced position where the recording paper 3 is cut and a retracted position separated from the advanced position. Here, the first cutter blade moving mechanism may be any mechanism that can reciprocate the first cutter blade 21 between the advanced position and the retracted position in accordance with the rotational motion of the transport motor 18. The first cutter blade 21 is an example of a first blade. The second cutter blade 22 is an example of a second blade. The first cutter blade moving mechanism is an example of a driving mechanism.

When the first cutter blade 21 moves to the cutting position B along the moving surface 23, the second cutter blade 22 is fixed at a position where the partial cut can be performed on the recording paper 3 interposed between the second cutter blade 22 and the first cutter blade 21.

In this manner, in the cutter 15, a partial cut is performed by interposing the recording paper 3 on the transport path 16 at the cutting position B between the second cutter blade 22 whose position is fixed and the first cutter blade 21 as the first cutter blade 21 moves from the retracted position to the advanced position. The configuration of the second cutter blade 22 may be any configuration as long as a partial cut can be performed on the recording paper 3 by interposing the recording paper 3 between the second cutter blade 22 and the first cutter blade 21 at the cutting position B. Therefore, a detailed description of the configuration of the second cutter blade 22 is omitted.

Configuration of First Cutter Blade

Figure 3:
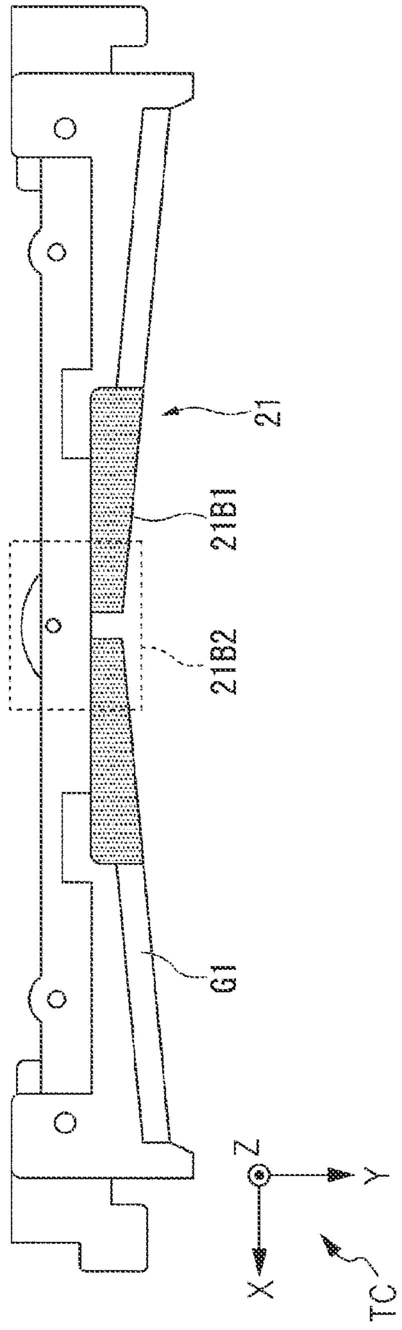
FIG. 3 is a diagram showing an example of a configuration of a first cutter blade when the first cutter blade is viewed downward.

Hereinafter, the configuration of the first cutter blade 21 will be described with reference to FIGS. 2 and 3. FIG. 3 is a diagram showing an example of a configuration of the first cutter blade 21 when the first cutter blade 21 is viewed downward.

As shown in FIG. 2, the first cutter blade 21 has a cutting edge 21*a* directed in the rear direction. The first cutter blade 21 has a plate shape and has a plane shape symmetrical to the left and right. The first cutter blade 21 is a V-shaped blade whose center in the left-right direction is retreated in the rear direction. Instead of the V-shaped blade, the first cutter blade 21 may be a blade having another shape, such as a blade having a shape that retreats in the rear direction from one of the left and right sides to the other. In this case, the first cutter blade 21 has a plate shape, but has a left-right asymmetric plane shape.

As shown in FIG. 3, the first cutter blade 21 includes a first site 21B1 that cuts the recording paper 3 together with the second cutter blade 22, and a second site 21B2 that forms the uncut portion without cutting the recording paper 3. In other words, the first cutter blade 21 has a site including a site that comes into contact with the second cutter blade 22 in the process of moving from the retracted position to the advanced position as the first site 21B1. In addition, the first cutter blade 21 has a site including a site that does not contact the second cutter blade 22 in the process as the second site 21B2. Thereby, the cutter 15 can perform a partial cut that partially separates the printed recording paper from the unprinted recording paper. In other words, the printing device 1 performs a partial cut by the cutter 15 to partially separate the printed recording paper from the unprinted recording paper. In the example shown in FIG. 3, the second site 21B2 is a site surrounded by a dotted line among the sites of the first cutter blade 21. That is, in the example, the first site 21B1 is a site other than the second site 21B2 among the sites of the first cutter blade 21.

Here, when the cutter 15 performs the partial cut, the printed recording paper partially connected to the unprinted recording paper after the cutting of the recording paper 3 easily changes its posture due to wind, vibration, or the like. For this reason, the printed recording paper may come into contact with the first cutter blade 21 and be torn from the unprinted recording paper. Therefore, the first site 21B1 of the first cutter blade 21 is provided with a guide member G1 as shown in FIGS. 2 and 3.

Configuration of Guide Member

Hereinafter, the configuration of the guide member G1 will be described with reference to FIGS. 2 and 3. As described above, the guide member G1 is a member that guides the recording paper 3 during the second transport performed by the printing device 1. In other words, the guide member G1 is a member that guides the recording paper 3 that moves in the direction opposite to the transport direction Z1 when the second transport is being performed by the printing device 1. As shown in FIG. 2, the guide member G1 has a slope. The slope of the guide member G1 is inclined along the direction away from the second cutter blade 22 as going from the upstream region to the downstream region in the transport direction Z1. In other words, the guide member G1 is provided on the downstream surface in the transport direction Z1 among the surfaces of the first cutter blade 21 and has, as the slope, a portion that is inclined in a direction in which the guide member G1 is separated from the recording paper 3 as going from the upstream region to the downstream region in the transport direction Z1. The slope may be a planar surface, a curved surface, or may have unevenness on the surface, or may not have unevenness on the surface.

Here, since the printing device 1 performs the partial cut, the cut edge of the printed recording paper partially connected to the unprinted recording paper after the cutting of the recording paper 3 comes into contact with the slope of the guide member G1 during the second transport. When the slope guides the unprinted recording paper and the printed recording paper such that the unprinted recording paper is transported together with the printed recording paper in the direction opposite to the transport direction Z1 by the second transport without tearing the printed recording paper. Accordingly, the printing device 1 can suppress the recording paper from being torn during the second transport without giving the guide member G1 a complicated structure.

Further, as described above, in the printing device 1, such a guide member G1 is provided at the first site 21B1 of the first cutter blade 21, and is not provided at the second site 21B2 of the first cutter blade 21. For this reason, the printing device 1 can reduce the size of the printing device 1 and can suppress an increase in the manufacturing cost of the printing device 1. The guide member G1 may be described as covering the first site 21B1.

The upstream in the transport direction Z1 is on the positive direction side of the Z axis in the examples shown in FIGS. 1 to 3. On the other hand, downstream in the transport direction Z1 is, in this example, on the negative direction side of the Z axis. Further, the guide member G1 may be provided in the second site 21B2 of the first cutter blade 21 together with the first site 21B1 of the first cutter blade 21. Further, the guide member G1 may be configured to have another structure capable of guiding the recording paper 3 during the second transport, instead of the slope described above.

Configuration of Second Guide Member

Here, as shown in FIG. 2, the printing device 1 is provided with a second guide member G2 that guides the recording paper 3 during the second transport performed by the printing device 1 in a region that is upstream of the cutting position B in the transport direction Z1 and downstream of the printing position A in the transport direction Z1. That is, the second guide member G2 is a member that guides the recording paper 3 moving in the direction opposite to the transport direction Z1 in the region when the second transport is being performed by the printing device 1. As shown in FIG. 2, the second guide member G2 has a slope. The slope of the second guide member G2 inclines along the front direction from the upstream region to the downstream region in the transport direction Z1 in the region. In other words, the second guide member G2 is provided in the region, and has, as the slope, a portion that is inclined in a direction in which the second guide member G2 is away from the recording paper 3 as going from the upstream region to the downstream region in the transport direction Z1. The slope may be a planar surface, a curved surface, or may have unevenness on the surface, or may not have unevenness on the surface. Here, since the printing device 1 performs the partial cut, the cut edge of the printed recording paper partially connected to the unprinted recording paper after the cutting of the recording paper 3 comes into contact with the slope during the second transport. When the slope guides the unprinted recording paper and the printed recording paper such that the unprinted recording paper is transported together with the printed recording paper in the direction opposite to the transport direction Z1 by the second transport without tearing the printed recording paper. Thereby, the printing device 1 can more reliably suppress the recording paper from being torn when the second transport is being performed. The printing device 1 may be configured to not include the second guide member G2.

Determining Whether or Not First Cutter Blade is Located at Home Position

The printing device 1 determines whether or not the first cutter blade 21 is located at the home position. The home position is a predetermined position before the partial cut is performed, and is a position where the printing device 1 keeps the first cutter blade 21 on standby. More specifically, the printing device 1 determines whether or not the first cutter blade 21 is located at the home position by detecting one position of the plurality of gears of the first cutter blade moving mechanism described above. Such a determination is performed in order to return the first cutter blade 21 whose position is unknown to the home position when the printing device 1 is started, when a paper jam occurs in the printing device 1, or the like.

In order to make such a determination, any one of the plurality of gears of the first cutter blade moving mechanism has a position detection sensor that detects the position of the gear, a sensor substrate on which the position detection sensor is mounted, and a covering member that covers at least a part of the sensor substrate. Hereinafter, for convenience of explanation, among the plurality of gears of the first cutter blade moving mechanism, the gear on which the position detection sensor, the sensor substrate, and the covering member are provided will be referred to as a target gear.

Figure 4:
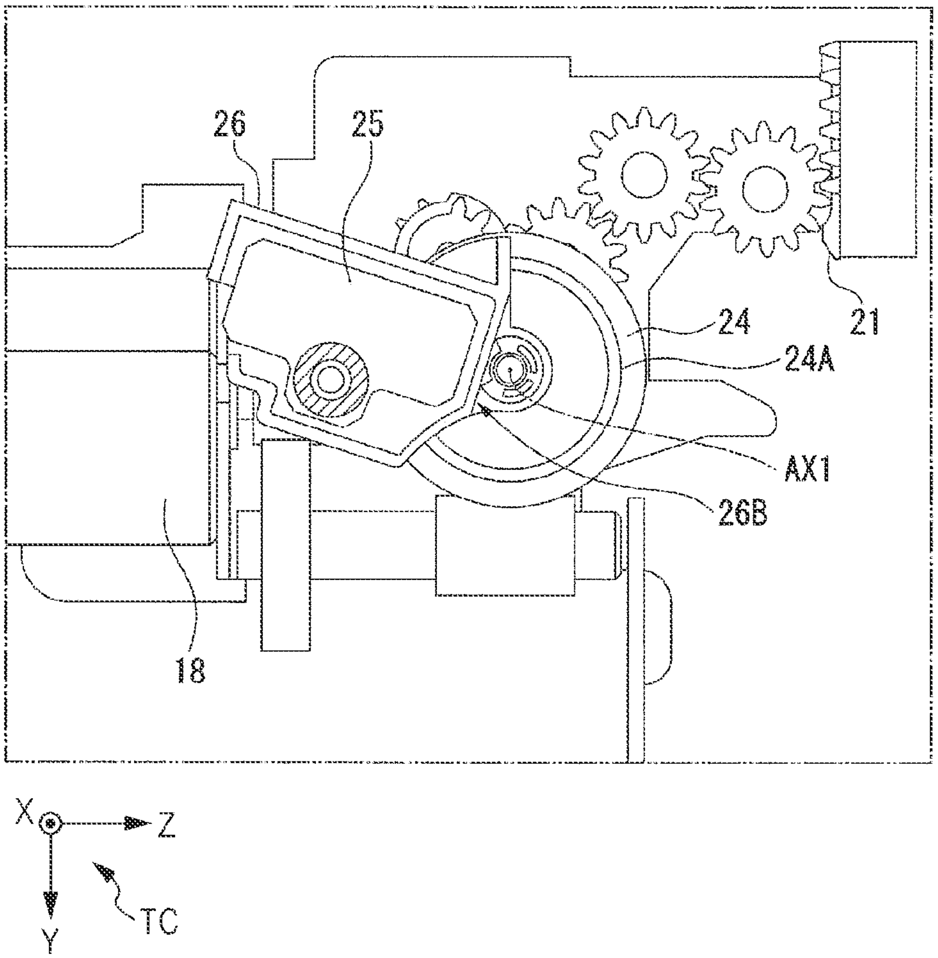
FIG. 4 is a diagram showing an example of a configuration of a first cutter blade moving mechanism when the first cutter blade moving mechanism is viewed in a left direction.
Figure 5:
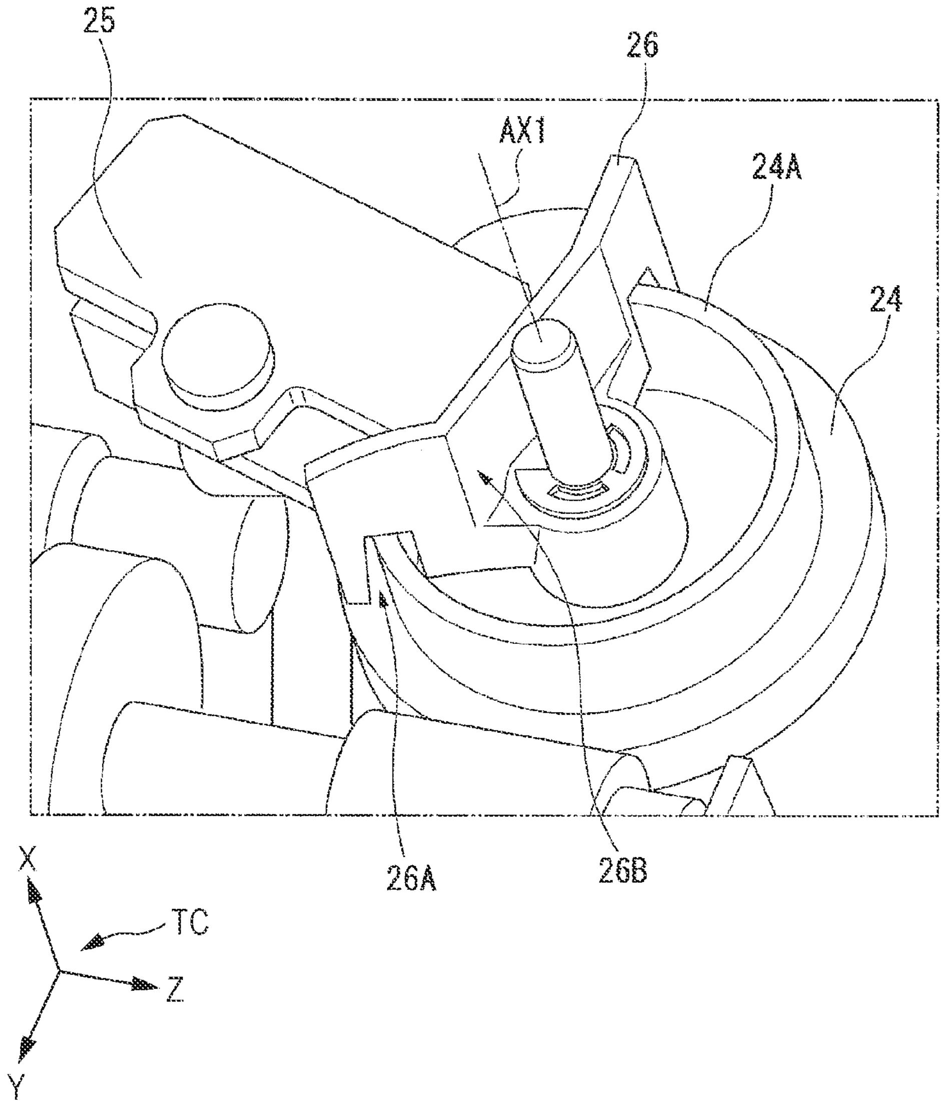
FIG. 5 is a perspective view of the first cutter blade moving mechanism.
Figure 6:
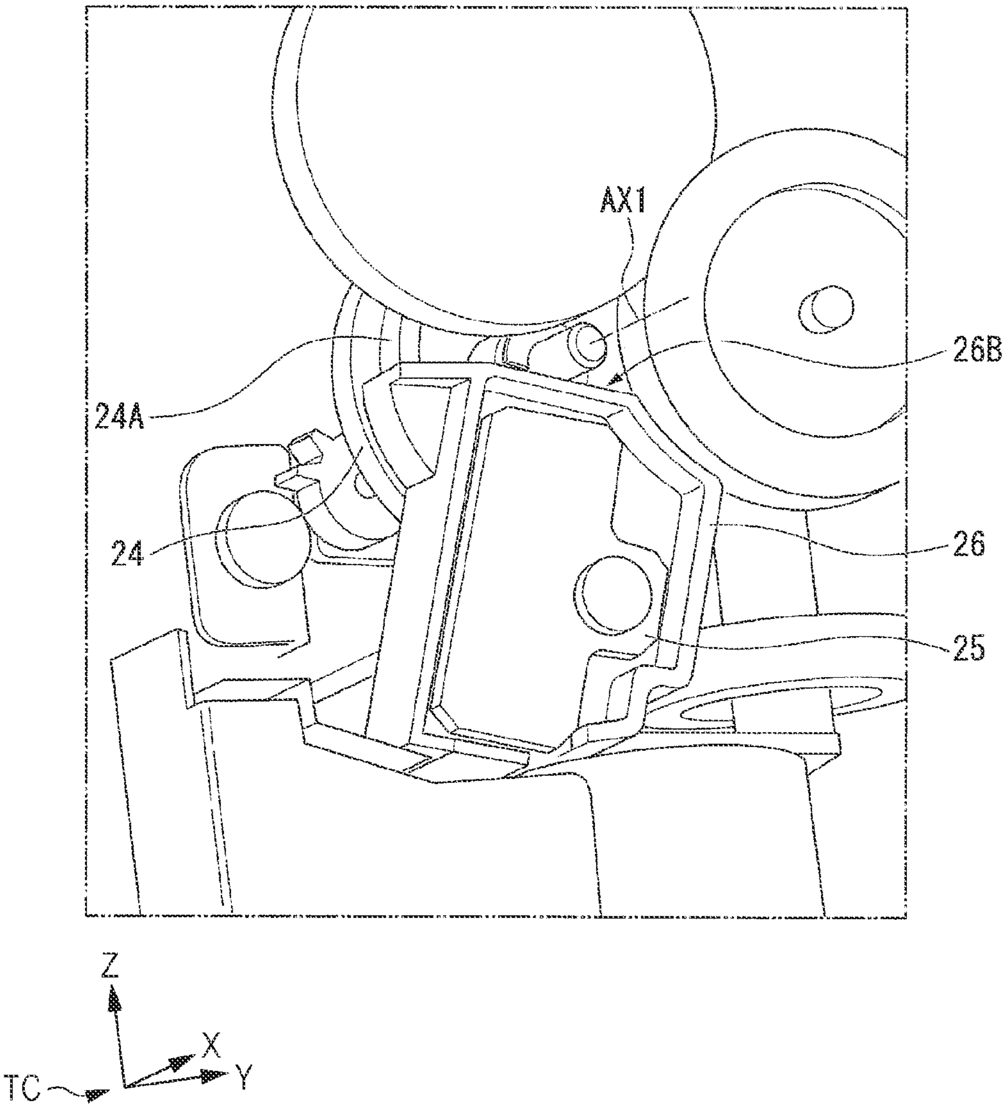
FIG. 6 is a perspective view of the first cutter blade moving mechanism when the first cutter blade moving mechanism is viewed from a different viewpoint from FIG. 5.

Here, FIG. 4 is a diagram showing an example of a configuration of the first cutter blade moving mechanism when the first cutter blade moving mechanism is viewed in a left direction. FIG. 5 is a perspective view of the first cutter blade moving mechanism. FIG. 6 is a perspective view of the first cutter blade moving mechanism when the first cutter blade moving mechanism is viewed from a different viewpoint from FIG. 5.

As shown in FIG. 4, the first cutter blade moving mechanism can move the first cutter blade 21 to front and rear by the transport motor 18 via the plurality of gears and the pinion rack mechanism. A gear 24 is one of the plurality of gears of the first cutter blade moving mechanism, and is an example of a target gear. The sensor substrate 25 is an example of the above-described sensor substrate. The covering member 26 is an example of the above-described covering member. However, in FIG. 5, in order to clearly show the positional relationship among the gear 24, the sensor substrate 25, and the covering member 26, a part of the covering member 26 is omitted.

In the example shown in FIGS. 4 to 6, the gear 24 meshes with a worm gear that rotates according to the rotation of a pinion attached to a pivot shaft of the transport motor 18. A protruding member 24A protrudes from the first surface of the gear 24. Here, in the examples shown in FIGS. 4 to 6, the first surface of the gear 24 is a surface on the right direction side of the two surfaces of the gear 24. The first surface of the gear 24 may be a surface opposite to the surface. That is, the first surface of the gear 24 is one of two surfaces of the gear 24 that intersect with a rotation axis AX1 of the gear 24.

Figure 7:
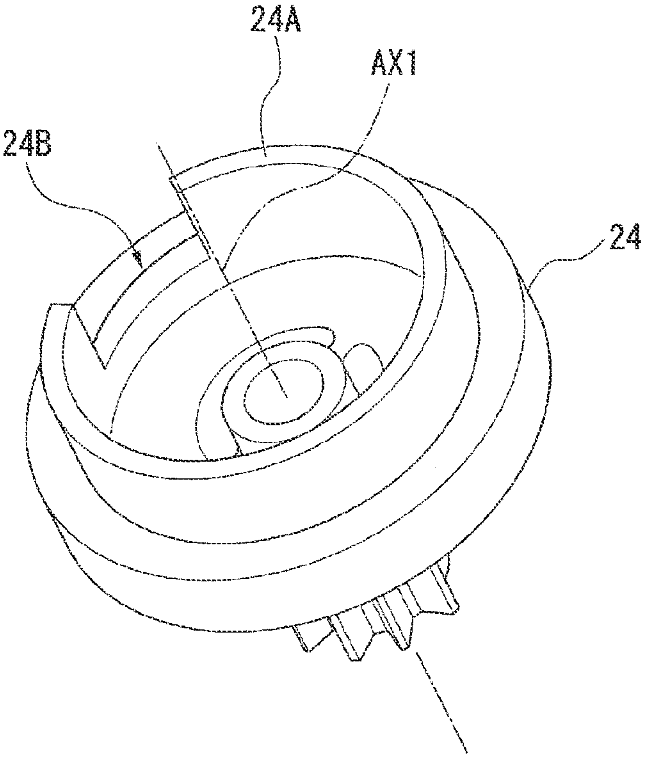
FIG. 7 is a perspective view of a gear.

Here, FIG. 7 is a perspective view of the gear 24. The protruding member 24A protrudes in a direction parallel to the rotation axis AX1 of the gear 24, as shown in FIG. 7. Further, in the example shown in FIG. 7, the protruding member 24A is a cylindrical rib having the rotation axis AX1 as a central axis, and has a notch 24B. The above-described position detection sensor detects the position of the gear 24 using the rib and the notch 24B. Instead, the shape of the protruding member 24A may be another shape that protrudes in a direction parallel to the rotation axis AX1.

Figure 8:
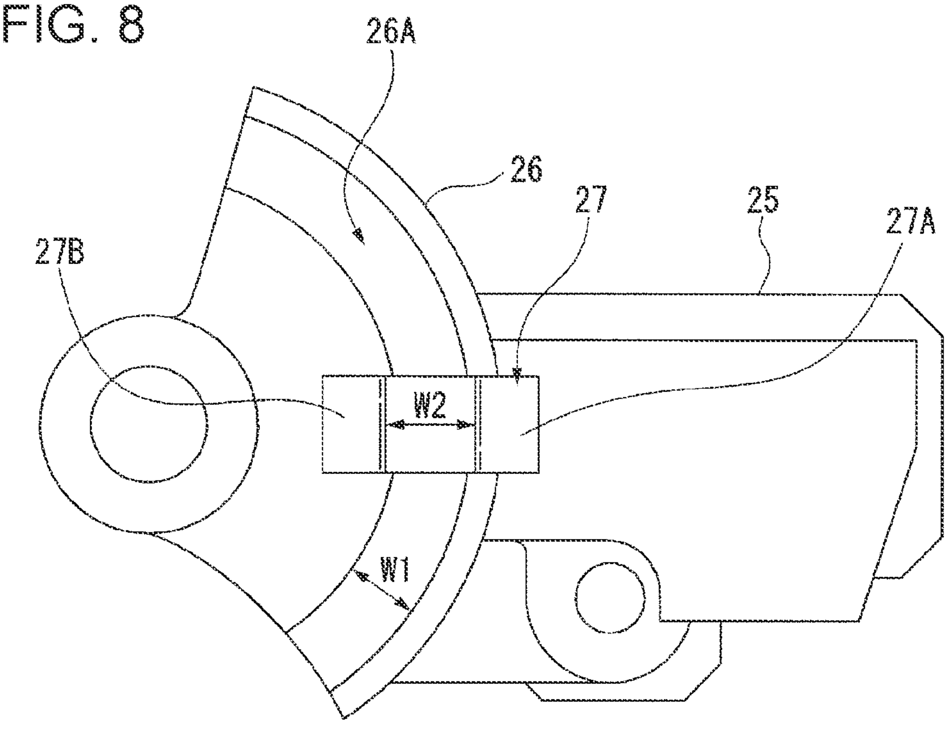
FIG. 8 is a diagram showing an example of a configuration of a covering member.

The covering member 26 covers at least a part of such a protruding member 24A. Here, FIG. 8 is a diagram showing an example of the configuration of the covering member 26. In the example shown in FIG. 8, the covering member 26 is provided with a passage route 26A having a width that allows the protruding member 24A to pass through. The sensor substrate 25 is provided on a surface of the covering member 26 opposite to the surface on which the passage route 26A is provided. In FIG. 8, in order to clearly show the positional relationship between the covering member 26 and the sensor substrate 25, some of the sites other than the passage route 26A of the sites of the covering member 26 are omitted.

The passage route 26A of the covering member 26 is a fan-shaped groove that passes through a part of the protruding member 24A. The center of the fan shape matches the center of the rotation axis AX1 of the gear 24. Therefore, the protruding member 24A that rotates together with the gear 24 in accordance with the rotation of the gear 24 can pass through the passage route 26A. Here, the width of the passage route 26A is indicated by a width W1 in FIG. 8.

Here, in FIGS. 4 to 6, the above-described position detection sensor is not visible because it is located on the back surface of the covering member 26. On the other hand, FIG. 8 shows a configuration of the covering member 26 on the back surface side. The position detection sensor 27 shown in FIG. 7 is an example of a position detection sensor. As shown in FIG. 8, the position detection sensor 27 is mounted on the sensor substrate 25. The position detection sensor 27 is controlled by the sensor substrate 25.

The position detection sensor 27 shown in FIG. 8 is an optical sensor. As shown in FIG. 8, the position detection sensor 27 includes a light emitting portion 27A that emits light in a direction intersecting the passage route 26A, and a light receiving portion 27B that receives light. That is, the position detection sensor 27 is provided on the covering member 26 such that the light path until the light emitted from the light emitting portion 27A is received by the light receiving portion 27B and the passage route 26A intersect. In the position detection sensor 27, the positional relationship between the light emitting portion 27A and the light receiving portion 27B may be reversed. Further, the position detection sensor 27 may be another sensor such as a magnetic sensor or a mechanical sensor as long as the position of the gear 24 can be detected, instead of the optical sensor. However, when the position detection sensor 27 is an optical sensor, the width W1 of the passage route 26A may be equal to or less than a distance W2 between the light emitting portion 27A and the light receiving portion 27B. Because, when the width W1 is equal to or less than the distance W2, in the printing device 1, the foreign matter adhering to the protruding member 24A is scraped and removed from the protruding member 24A by both end portions of the passage route 26A when the protruding member 24A passes through the passage route 26A. As a result, the printing device 1 can prevent the foreign matter from entering between the light emitting portion 27A and the light receiving portion 27B and causing a problem in the position detection sensor 27. The foreign matter is, for example, dust, paper dust, or the like. Further, more specifically, the width W1 of the passage route 26A is a width in a direction orthogonal to the traveling direction of the protruding member 24A when the protruding member 24A passes through the passage route 26A. The distance W2 between the light emitting portion 27A and the light receiving portion 27B is the shortest distance among the distances between the light emitting portion 27A and the light receiving portion 27B.

Here, when the above-described notch 24B passes between the light emitting portion 27A and the light receiving portion 27B, the amount of light received by the light receiving portion 27B increases as compared with when a site of the covering member 26 other than the notch 24B passes between the light emitting portion 27A and the light receiving portion 27B. That is, the position detection sensor 27 detects a change in the amount of light received by the light receiving portion 27B as the protruding member 24A passes between the light emitting portion 27A and the light receiving portion 27B. The position detection sensor 27 outputs information indicating the amount of light detected by the light receiving portion 27B to a control portion (not shown) included in the printing device 1 as an output of the light receiving portion 27B. The control portion determines the position of the first cutter blade 21 based on the acquired output of the light receiving portion 27B. Specifically, based on the output, the control portion determines that the first cutter blade 21 is located at the home position when the amount of light detected by the light receiving portion 27B is equal to or greater than a predetermined threshold. On the other hand, based on the output, the control portion determines that the first cutter blade 21 is not located at the home position when the light amount of the light detected by the light receiving portion 27B is less than the predetermined threshold.

The control portion included in the printing device 1 is, for example, a central processing unit (CPU) included in the printing device 1. The control portion may be another processor included in the printing device 1 such as a field programmable gate array (FPGA).

Covering of Sensor Substrate with Covering Member

Here, in the printing device 1, there are cases when light, foreign matter, and the like enter the inside of the printing device 1 from the above-described discharge port 5. The foreign matter is, for example, dust, paper dust, liquid, or the like. In such a case, there is a possibility that the sensor substrate 25 is exposed to light, the foreign matter, and the like. When the sensor substrate 25 is exposed to light, the foreign matter, or the like, a problem may occur in the position detection sensor 27.

Therefore, in the printing device 1, at least a part of the sensor substrate 25 is covered with the covering member 26 described above. The covering member that covers at least a part of the sensor substrate 25 may be a member separate from the covering member 26.

Specifically, in the printing device 1, as shown in FIGS. 4 to 6, the covering member 26 is located downstream of the sensor substrate 25 in the transport direction Z1, and has a first covering wall 26B covering the sensor substrate 25. Since the covering member 26 has the first covering wall 26B, in the printing device 1, when the inside of the printing device 1 is viewed from the discharge port 5, the sensor substrate 25 is covered with the first covering wall 26B and cannot be seen. In other words, the first covering wall 26B is a wall that covers the sensor substrate 25 so that the sensor substrate 25 cannot be seen when the inside is viewed from the discharge port 5. Here, when each of the first covering wall 26B and the sensor substrate 25 is projected on a virtual plane orthogonal to the transport direction Z1, the contour of the sensor substrate 25 projected on the virtual plane may be included inside the contour of the first covering wall 26B projected on the virtual plane. Since the sensor substrate 25 is covered by the first covering wall 26B, even when light, foreign matter, or the like enters the discharge port 5, the sensor substrate 25 is unlikely to be exposed to the light, the foreign matter, or the like in the printing device 1. As a result, the printing device 1 can suppress the occurrence of a defect in the optical sensor. Further, since the first covering wall 26B is provided on the covering member 26 that holds the sensor substrate 25, the printing device 1 can save space as compared with when an additional member is provided to prevent the sensor substrate 25 from being exposed to light, the foreign matter, and the like, and as a result, the size can be reduced.

The first covering wall 26B may be a wall of any shape and a wall of any size as long as the first covering wall 26B can cover the sensor substrate 25 so that the sensor substrate 25 cannot be seen when the inside of the printing device 1 is viewed from the discharge port 5. In addition, the first covering wall 26B may be such that at least a part of the first covering wall 26B is located downstream of the covering member 26 so that the sensor substrate 25 cannot be seen in this case, and for example, the configuration which covers the whole sensor substrate 25 may be sufficient. However, when the first covering wall 26B is configured to cover a part of the sensor substrate 25, the printing device 1 can save space, and as a result, the size can be reduced. Further, the first covering wall 26B may be configured to include, as a slope portion, a slope that is inclined along one predetermined direction of the directions away from the rotation axis AX1. The slope portion may have a configuration having a slope inclined along each of two or more predetermined directions out of the direction away from the rotation axis AX1, that is, an umbrella structure.

Since the printing device 1 has a low possibility that the sensor substrate 25 is exposed to light, foreign matter, or the like that enters the inside of the printing device 1 from the discharge port 5, printing can be performed in each of a plurality of postures. Here, the posture of the printing device 1 is represented by the direction in which each of the surfaces of the printing device 1 faces in the space where the printing device 1 is installed. For example, the printing device 1 can print in a posture in which the upper surface of the printing device 1 faces in a direction opposite to the direction of gravity in the space, and a posture in which the lower surface of the printing device 1 faces in the direction of gravity in the space. In other words, the printing device 1 can perform printing in a posture in which the upper surface of the printing device 1 faces upward and a lower surface of the printing device 1 faces downward. This posture is a posture in which a foreign matter easily enters the inside of the printing device 1 from the discharge port 5, and is also a posture in which the user of the printing device 1 easily acquires the printed recording paper. Further, for example, the printing device 1 can also print in a posture in which the upper surface of the printing device 1 faces in a direction orthogonal to the direction of gravity in the space, and a posture in which the lower surface of the printing device 1 in the space in the opposite direction to the direction. In other words, the printing device 1 can perform printing in a posture in which the upper surface of the printing device 1 faces forward and the lower surface of the printing device 1 faces rearward. This posture is also a posture in which a foreign matter easily enters the inside of the printing device 1 from the discharge port 5, and is a posture in which the user of the printing device 1 can easily acquire the printed recording paper. As described above, in the printing device 1, since the sensor substrate 25 may be exposed to light, foreign matter, and the like that enter the inside of the printing device 1 from the discharge port 5, in each of the plurality of postures, it is necessary to take countermeasures to prevent foreign matter from entering through the discharge port 5. In the printing device 1, since the first covering wall 26B is provided downstream of the sensor substrate 25 in the transport direction Z1, it is possible to prevent the sensor substrate 25 from being exposed to foreign matter. For example, when the upper surface of the printing device 1 faces upward and the first covering wall 26B has the above-described slope portion, the printing device 1 can guide foreign matter falling in the direction of gravity by the slope portion and the foreign matter can be dropped away from the sensor substrate 25, and the sensor substrate 25 can be protected from the foreign matter. Since the printing device 1 can print in each of the plurality of postures, the degree of freedom of installation can be increased, and the convenience of the user can be improved.

As described above, the printing device according to the embodiment is a printing device that cuts recording paper with the first blade and the second blade, and has a driving mechanism that moves the first blade, the driving mechanism includes a gear, a protruding member protruding from the first surface of the gear, a covering member covering at least a part of the protruding member, and an optical sensor provided on the covering member and having a light emitting portion for emitting light in a direction intersecting the protruding member and a light receiving portion for receiving light, and the covering member is provided with a passage route having a width through which the protruding member can pass, and the width of the passage route is equal to or less than the distance between a light emitting portion and a light receiving portion. Thus, the printing device can suppress the occurrence of a defect in the optical sensor.

In the printing device, a configuration may be used in which the protruding member protrudes in a direction parallel to the rotation axis of the gear.

Further, in the printing device, a configuration may be used in which the protruding member is a cylindrical rib having the rotation axis as a central axis and has a notch.

Further, a configuration may be used in which the printing device includes a control portion that determines the position of the first blade based on the output of the light receiving portion according to the rotation of the protruding member.

The printing device includes a transport roller configured to transport the recording paper drawn from the roll paper in the transport direction, a cutter configured to cut the recording paper using the first blade and the second blade, and a driving mechanism configured to move the first blade, the driving mechanism has a gear, a position detection sensor that detects the position of the gear, a sensor substrate mounted with the position detection sensor, and a covering member that covers at least a part of the sensor substrate, and the covering member has a first covering wall that is located downstream of the sensor substrate in the transport direction and covers the sensor substrate. Thereby, the printing device 1 can suppress the occurrence of a defect in the optical sensor.

Further, in the printing device, a configuration may be used in which the gear is provided with a protruding member and the covering member is provided with a passage route having a width through which the protruding member can pass, and the position detection sensor has a light emitting portion emitting light in a direction intersecting the passage route and a light receiving portion for receiving light and the width of the passage route is equal to or less than the distance between a light emitting portion and a light receiving portion.

Further, a configuration may be used in which the printing device includes a control portion that determines the position of the first blade based on the output of the position detection sensor.

In addition, a configuration may be used in which the printing device is capable of printing in the first posture and capable of printing in a second posture different from the first posture.

The printing device further includes a transport roller performing a first transport that transports the recording paper drawn from the roll paper in the transport direction and a second transport that transports the recording paper in a direction opposite to the transport direction, a cutter for cutting the recording paper by the first blade and the second blade, and a driving mechanism for driving the first blade are provided, and the first blade is provided with a guide member for guiding the recording paper during the second transport. This makes it possible for the printing device to prevent the recording paper from being torn during the second transport.

In the printing device, a configuration may be used in which the guide member is located downstream of the first blade in the transport direction, and the guide member has a slope, and the slope inclines along the direction away from the second blade as going from an upstream region to a downstream region in the transport direction.

The printing device may further include a second guide member provided upstream of the first blade in the transport direction and guiding the recording paper that moves in a direction opposite to the transport direction during the second transport.

In the printing device, a configuration may be used in which the guide member comes into contact with the cut edge of the recording paper cut by the cutter during the second transport.

In the printing device, the first blade has a first site that cuts the recording paper together with the second blade, and a second site that does not cut the recording paper, and the guide member is provided at the first site.

The embodiment of the present disclosure has been described in detail with reference to the drawings. However, the specific configuration is not limited to this embodiment, and may be changed, replaced, deleted, or the like without departing from the gist of the present disclosure.

Further, a program for realizing the function of any component in the above-described apparatus may be recorded on a computer-readable recording medium, and the program may be read and executed by a computer system. Here, the device is, for example, the printing device 1 or the like. Here, the "computer system" includes an operating system (OS) and hardware such as peripheral devices. The "computer-readable recording medium" refers to a portable medium such as a flexible disk, a magneto-optical disk, a ROM, a Compact Disk (CD)-ROM, and a storage device such as a hard disk built in a computer system. Furthermore, the term "computer-readable recording medium" also refers to a recording medium holding a program for a certain period time as a volatile memory in a computer system serving as a server or a client when a program is transmitted through a network such as the Internet or a communication line such as a telephone line.

Further, the above program may be transmitted from a computer system storing the program in a storage device or the like to another computer system via a transmission medium or by a transmission wave in the transmission medium. Here, the "transmission medium" for transmitting a program refers to a medium having a function of transmitting information, such as a network such as the Internet or a communication line such as a telephone line.

Further, the above program may be a program for realizing a part of the functions described above. Further, the above-mentioned program may be a program that can realize the above-described functions in combination with a program already recorded in the computer system, that is, a so-called difference file or a difference program.

What is claimed is:

1. A printing device comprising:
- a transport roller configured to perform a first transport that transports recording paper drawn from a paper in a transport direction and configured to perform a second transport that transports the recording paper in a direction opposite to the transport direction;
- a cutter configured to cut the recording paper;
- a first guide member provided downstream of the cutter in the transport direction and configured to contact the recording paper; and
- a second guide member provided upstream of the cutter in the transport direction and configured to contact the recording paper, wherein
- the cutter includes:
  - a first blade configured to move between an advanced position and a retracted position; and
  - a second blade configured to cut the recording paper together with the first blade moving from the retracted position to the advanced position;
- the first guide member is provided downstream of the first blade in the transport direction,
- the second guide member is provided upstream of the first blade in the transport direction, and
- at least art of the first blade is covered by the first guide member.

2. The printing device according to claim 1, wherein the first guide member has a slope that is inclined along a direction away from the second blade as going from an upstream region to a downstream region in the transport direction.

3. The printing device according to claim 1, wherein the first guide member comes into contact with a cut edge of the recording paper cut by the cutter.

4. The printing device according to claim 1, further comprising:
- a print head configured to print on the recording paper; and
- wherein the second guide member is provided downstream of the print head in the transport direction.

5. The printing device according to claim 1, further comprising:
- a print head configured to print on the recording paper;
- a platen roller configured to face the print head; and
- wherein the second guide member is provided downstream of a rotation axis the platen roller in the transport direction.

6. A printing device comprising:
- a transport roller configured to perform a first transport that transports recording paper drawn from a roll paper in a transport direction and configured to perform a second transport that transports the recording paper in a direction opposite to the transport direction;
- a cutter configured to cut the recording paper;

a first guide member provided downstream of the cutter in the transport direction and configured to contact the recording paper; and a second guide member provided upstream of the cutter in the transport direction and configured to contact the recording paper, wherein the cutter includes:

a first blade configured to move between an advanced position and a retracted position; and a second blade configured to cut the recording paper together with the first blade moving from the retracted position to the advanced position;

the first guide member is provided downstream of the first blade in the transport direction, the second guide member is provided upstream of the first blade in the transport direction, and the first blade includes a first site at least a part of which is covered by the first guide member and which cuts the recording paper together with the second blade, and a second site that forms an uncut portion without cutting the recording paper.

* * * * *